United States Patent [19]

Francioni

[11] Patent Number: 5,170,877
[45] Date of Patent: Dec. 15, 1992

[54] METHOD OF REGULATING THE ADVANCE OF ARTICLES IN A CONVEYOR SYSTEM, PARTICULARLY AN AUTOMATIC PACKAGING SYSTEM, AND THE SYSTEM CONCERNED

[75] Inventor: Renzo Francioni, Prato Sesia, Italy

[73] Assignee: Cavanna S.p.A., Italy

[21] Appl. No.: 696,920

[22] Filed: May 8, 1991

[30] Foreign Application Priority Data

Aug. 17, 1990 [IT] Italy ................................ 67646 A/90

[51] Int. Cl.$^5$ ............................................. B65G 43/08
[52] U.S. Cl. .................................. 198/358; 198/347.3; 198/436; 198/572; 198/577
[58] Field of Search ...................... 198/347.3, 358, 436, 198/437, 571, 572, 573, 575, 577

[56] References Cited

U.S. PATENT DOCUMENTS

| | | | |
|---|---|---|---|
| 3,608,698 | 9/1971 | Crall | 198/358 X |
| 4,086,998 | 5/1978 | van der Schoot | 198/358 |
| 4,161,094 | 7/1979 | Blidung et al. | 198/358 X |
| 4,200,181 | 4/1980 | Clarke | 198/572 |
| 4,280,611 | 7/1981 | Molins et al. | 198/572 X |
| 4,373,624 | 2/1983 | Molins et al. | 198/358 X |
| 4,618,341 | 10/1986 | Oldham et al. | 198/347.3 X |

FOREIGN PATENT DOCUMENTS 2754859 8/1978 Fed. Rep. of Germany ...... 198/358

*Primary Examiner*—Joseph E. Valenza
*Assistant Examiner*—Tuan N. Nguyen
*Attorney, Agent, or Firm*—Evenson, Wands, Edwards, Lenahan & McKeown

[57] ABSTRACT

In a conveyor system including a main conveyor line and a plurality of branch lines, when there is a stoppage in one of the branch lines, the operating speeds of the branch lines which are still active are increased so as to ensure that the entire flow of articles is disposed of. Each branch line which is still active changes to the faster operating speed only after it has been found that articles have actually accumulated on that branch line.

8 Claims, 2 Drawing Sheets

METHOD OF REGULATING THE ADVANCE OF ARTICLES IN A CONVEYOR SYSTEM, PARTICULARLY AN AUTOMATIC PACKAGING SYSTEM, AND THE SYSTEM CONCERNED

DESCRIPTION

The present invention relates in general to automatic conveyor systems and has been developed with particular attention to its possible use in automatic packaging systems, particularly for the packaging of food products.

More precisely, the invention is applicable to the situation shown schematically in FIG. 1.

This drawing is a schematic plan view of part of an automatic packaging system and shows:
- a station S for supplying articles A, constituted, for example, by an oven, a machine for moulding chocolate, etc., which discharges a continuous or substantially continuous flow of articles A (biscuits, bars of chocolate, etc.) arranged in rows, that is, with lines of identical articles advancing in a direction generally perpendicular to the direction in which they are aligned;
- a main conveyor line or pass 1 (constituted, in widely known manner, by several conveyors, typically endless belt conveyors, in cascade) which receives the articles A from the station S and advances them in an orderly flow (from left to right in the situation to which FIG. 1 refers); and
- a plurality of branch lines including respective withdrawal stations 2, known in the field as RFS, that is, Row Feeding Stations, of which there are four in this case and the function of which is to withdraw single rows of articles A from the flow advancing on the main line 1 in order to send them to corresponding user stations W1...Wn (n=4 in this case) constituted, for example, by wrapping machines for packaging the articles A either individually or in groups.

The criteria for the formation of RFS stations 2 of many different configurations are widely known in the art and do not need to be repeated herein. In general, the stations 2 may be formed so that they can withdraw articles A presented on the main conveyor 1 upstream, or possibly downstream, of an individual station 2 with reference to the direction in which the articles A advance on the conveyor 1.

This applies principally to the station 2 which is furthest downstream and is usually associated with a further conveyor 3 which can move in both directions and is intended to act as a storage conveyor. Briefly, the conveyor 3 is usually formed so that it can receive rows of articles A which (for reasons which will be explained further below) have managed to pass even the last station 2 without being transferred to a respective user station Wk (k=1, ..., n) so as to store them temporarily for eventual transfer in reverse, in particular, towards the station 2 which is furthest downstream, in order to be sent to the user stations.

In conditions of normal use, the system of FIG. 1 is regulated (according to known criteria) so that, if there are n withdrawal stations 2 associated with n respective user stations Wk, each station 2 withdraws from the flow advancing on the main conveyor 1 a fraction equal to 1/nth of the main flow, that is — in practice — one in every n rows.

The regular operation of the system is frequently upset, however, by interruptions in the operation of the user stations Wk (with the result that the respective branch line of the system can no longer take in articles); this is not necessarily because of a breakdown, but also because of phenomena included and expected in the normal operation of the stations.

For example, if the stations are wrapping machines, there may be a temporary stoppage because a reel of wrapping sheet has run out and the correct supply of the sheet needs to be re-established (so-called "paper-changing").

There is thus the problem of setting up the system in a manner such that it can absorb such transitory phenomena without the need to discard rows of articles A which have not been taken up by the machine which has temporarily stopped.

This problem can be solved in various ways.

For example, it has already been proposed to form each withdrawal station 2 so that it can perform a certain local storage function for rows of articles A which cannot be transferred to the respective user station Wk which has stopped temporarily. With this solution, one or more rows which are temporarily "parked" in the withdrawal station 2 are then transferred to the respective user station when it starts to operate again, to transfer stations 2 further downstream in the flow, or even to the storage belt 3 if the stoppage is to be prolonged.

This conceptually brilliant solution creates considerable difficulties in practice, however, both because of the structural complexities of the individual withdrawal stations 2 and because the problem of the temporary stoppages of the user stations W1... Wn is resolved not comprehensively by a centralised intelligence of the system but by partial solutions adopted at the level of the local intelligence of each individual transfer station 2.

An attempt to solve the problem at a centralised level has been made by some manufacturers with the use of a general principle according to which, when a temporary stoppage of one of the user stations Wk is detected, the operating speeds of all the other user stations (and of the respective withdrawal stations 2) are immediately increased and each withdrawal or branch line of the system which is still active is arranged so that it can take a fraction of 1/(n-1)th of the articles A instead of 1/nth.

In fact, on the assumption that four user stations W1...W4 are available and, under normal conditions, each takes in ¼ of the flow of articles A, in the event of a stoppage of one station, each of the stations which are still active increases its operating speed so that it can take ⅓ of the articles A coming from the supply station S.

This solution also has disadvantages resulting from the fact that there may be rows of articles on the main conveyor 1 which cannot be withdrawn even when the stations which are still active are operating faster and there is thus a need to send them to the storage belt 3 in any case. More importantly, one or more withdrawal stations 2 which have been arranged to operate faster may not, in fact, be able to withdraw rows of articles A immediately whereby the respective user stations Wk downstream, which have been made to operate more quickly, are not actually supplied. In the case of a wrapping machine, one or more empty packages (without articles) may be produced and will have to be discarded.

In order to solve this problem, it has also been proposed to associate sensor means (optical gates or the like) with the withdrawal stations 2 for monitoring the density of the flow of the rows of articles A on the main conveyor 1 upstream of each station 2 and generating analog output signals indicative of the density of the flow. The analog signals are used to pilot the user station Wk situated downstream. This is done in such a way that the station can be adjusted in an analog manner for the articles A actually available on the main conveyor 1 for taking up by the respective withdrawal station 2.

The piloting signal is usually produced by an electrical circuit which provides an average of a pulsed signal, each pulse of which is indicative of the arrival of a row of articles A.

In practice, however, the value of this analog signal is found to be subject to continuous oscillation over a fairly wide range.

In this connection, it should also be noted that, in systems such as that shown in FIG. 1 which are formed according to the most recent techniques, the operating speeds of the user stations Wk may be of the order of several hundreds of "beats" per minute (for example 500) and that the operating speed may oscillate (in the case of a system including four user stations Wk) towards an upper value more than a third faster than its nominal operating speed.

In fact, as has been seen, in normal operation, each station takes $\frac{1}{4}$ (that is, 25%) of the total flow of articles A, whilst the faster operating speed envisaged during the stoppage of one of the machines causes each of the machines which are still active to take $\frac{1}{3}$ (that is, 33%) of the total flow. This corresponds to a need to take about 8% more of the flow of articles, which is almost a third of the 25% normally taken by the station.

In general, therefore, the oscillation of the operating speed within such a critical range is a disadvantage which can cause premature wear of the equipment.

Another solution which has been proposed is to provide an additional branch line in the system (typically downstream of all the others) which is inactive during the normal operation of the system and is intended to be used to replace any of the other branch lines of which the user station Wk has temporarily stopped.

However, this solution is also considered unsatisfactory.

In the first place, because of the nature of the typical interruptions of the operation of the stations Wk (which, as has been seen, are quite frequent and of short duration), the auxiliary line has to be switched continually between an inactive state and states of rapid activation.

Moreover, the presence of the additional line is considered to be an unnecessary burden on costs and usage of space by the final user.

The main object of the present invention, therefore, is to provide means for controlling the operation of a system such as that shown in FIG. 1 which can prevent the problems outlined above.

According to the present invention, this object is achieved by means of a method of control having the characteristics recited in the claims which follow.

A further subject of the invention is a system which operates according to the control method.

The invention will now be described, purely by way of non-limiting example, with reference to the appended drawings, in which.

Figure 1:
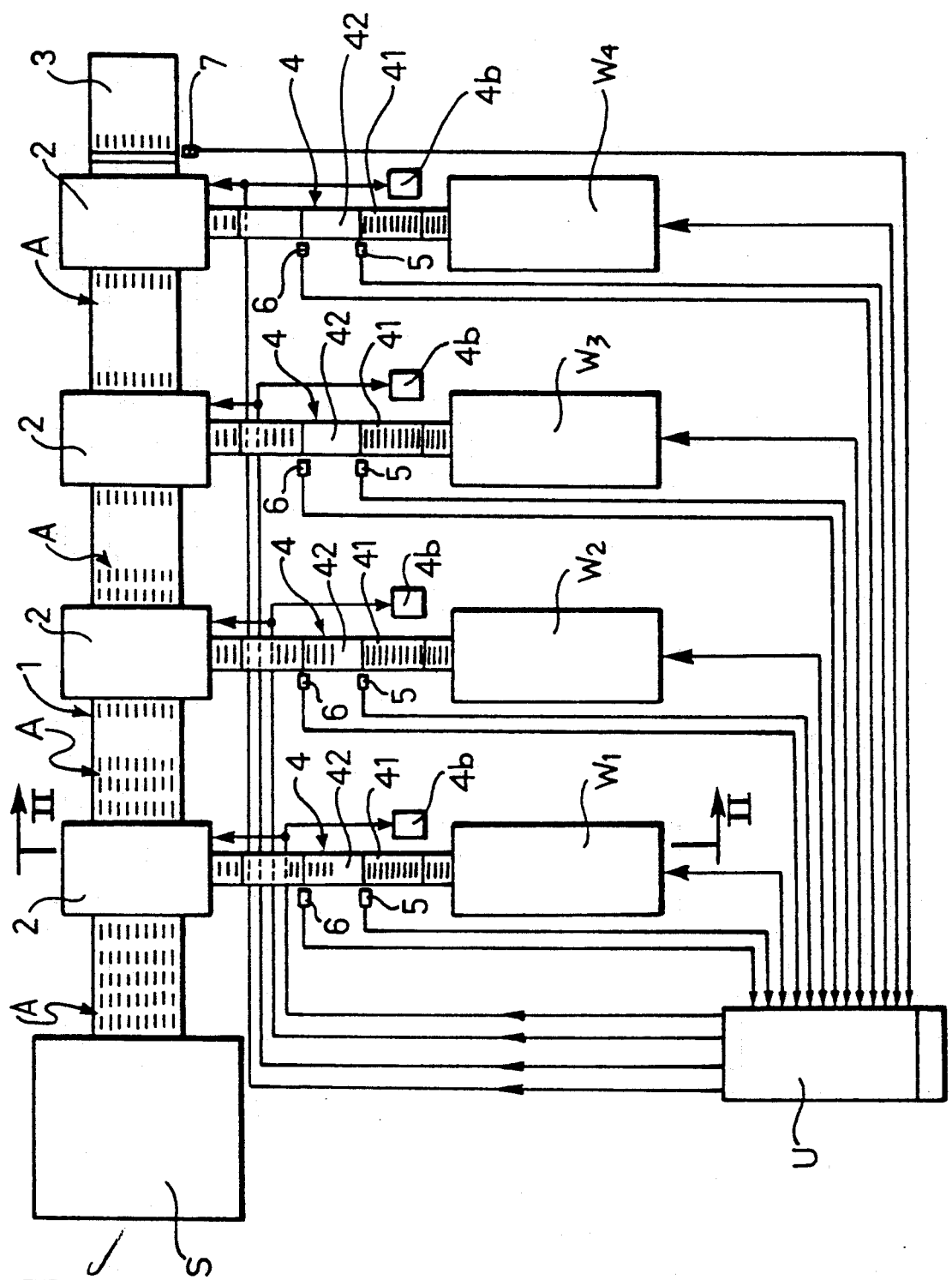
FIG. 1 shows the layout of a packaging system and has already been described fully above; the same drawing will be used, however, to illustrate the characteristics of the invention.
Figure 2:
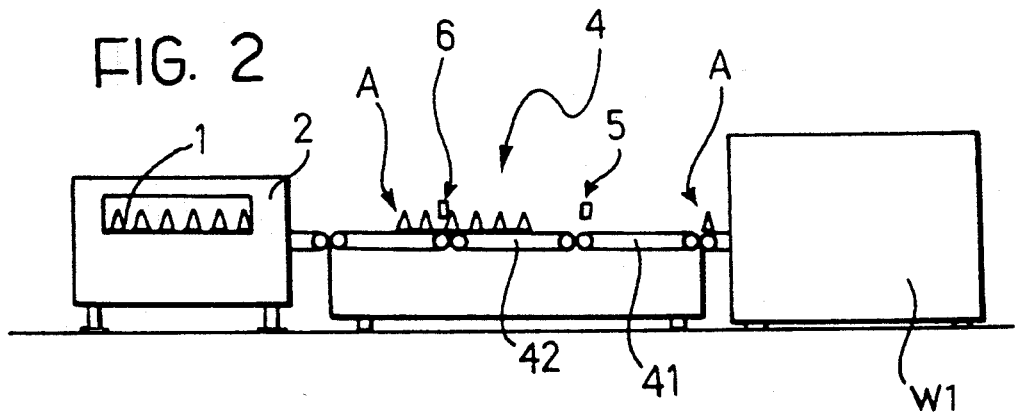
FIG. 2 is a schematic view of part of the system shown in FIG. 1 and corresponds approximately to the line II—II of FIG. 1.

The general description of the structure and operation of an automatic packaging system given above with reference to FIG. 1 also refers, to all intents and purposes, to the present invention The main characteristic of the invention is the provision in the system shown in FIG. 1 and, more precisely, in a position intermediate each withdrawal station (RFS) 2 and the respective user station Wk of a conveyor 4 which is piloted by the general management unit U of the system (usually a PLC controller) according to criteria which will be described further below.

More precisely, each conveyor 4 is constituted by several endless belt conveyors in cascade (with respective drive units 4b controlled by the unit U — all according to criteria widely known in the art which do not need to be repeated in detail herein) with the provision of a function for detecting accumulations of articles A connected to at least two optical gates or sensors 5, 6 at the upstream ends of respective portions of the conveyor 4.

More precisely, the optical sensor 5 is at the upstream end of the portion 41 of the conveyor 4 which is furthest downstream (that is, the portion nearest the respective user machine Wk), whilst the sensor 6 is associated with the upstream end of the portion 42 of the conveyor 4 upstream of the portion 41.

Naturally, other kinds of sensors may be used to detect the presence of articles A on the conveyor portions 41 and 42 (for example, feelers with pivoting arms which are moved by contact with the advancing articles A).

The use of optical sensors (for example, the photodetector systems produced by the company Erwin Sick of the Federal Republic of Germany), however, is currently thought preferable.

In any case, the characteristics of the detection systems and the ways in which they are used are widely known in the art and do not need a specific description herein.

By way of summary, it should be remembered that the function of the sensor 5 is essentially to provide a signal indicative of the fact that there is a sufficient accumulation or stock of articles A on the conveyor 41 for the user station Wk immediately downstream to operate correctly. This takes place, for example, with small variations in the speed of advance of the conveyor portion 42 (and/or any conveyor elements located downstream) in order to prevent too compact a queue of articles from forming on the conveyor 42, whilst preventing the flow of articles from becoming excessively spread out.

For a full description of this flow-regulating function, reference may usefully be made to the description of U.S. Pat. No. 4,962,844 assigned to the same assignee of this application.

The sensor 6 upstream, however, has the function of detecting and signalling to the unit U, by the emission of a corresponding signal, a situation in which the row of products accumulating upstream of the user station Wk has extended to occupy the whole of the conveyor portion 42.

Naturally, in a further extension of the invention (not shown specifically in the drawings) the function of the sensor 6 may be reproduced by further sensors arranged upstream and each intended to check whether the accumulating queue extends beyond a respective conveyor.

As well as the signals supplied by the sensors 5 and 6, the management unit U of the system also receives signals from the individual stations Wk, indicative of whether each station Wk is operating normally or has stopped temporarily.

A further sensor 7 associated with the storage conveyor 3 can indicate to the unit U the presence of one or more rows of articles A stored on the conveyor 3.

Figure 3:
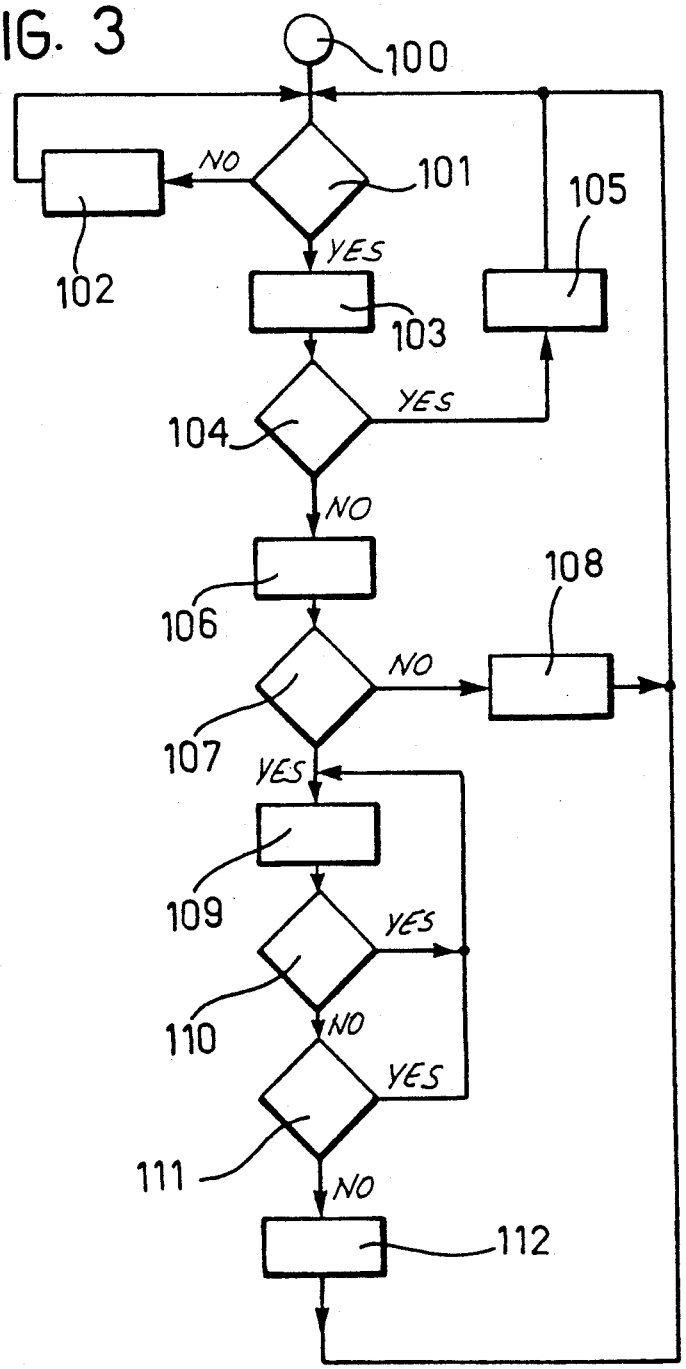
FIG. 3 is a flow chart showing the operating sequence of a system according to the invention.

The unit U (which, as stated, is constituted by a PLC or an equivalent processing unit) controls the operation of each withdrawal station 2, the respective conveyor 4, and the user station Wk of each branch of the flow of articles A according to the logic (implemented at the software level) expressed by the flow chart of FIG. 3.

After a starting step 100, it is first checked (step 101) whether the respective station is operating correctly.

If the station Wk has stopped temporarily, an alarm signal is sent to the unit U (step 102) for use according to the criteria described above.

If the machine is operating correctly, the unit U performs this exchange of data with all the component machines of the system (step 103).

In a subsequent step 104, the unit U checks, on the basis of the readings of step 103, whether all the machines Wk are operating correctly and, if the result is positive, confirms, in a step. 105, the command for all the machines and the respective associated members (withdrawal stations 2, conveyors 4) situated upstream thereof to continue to operate at the normal speed (the withdrawal of a fraction 1/nth of the total flow of articles, where n is the number of stations Wk in the system), and then starts the checking operation of step 101 again.

If the result is negative, that is, if it is found that one of the — other — machines Wk of the system has stopped temporarily, the machine is prepared for possible operation at a faster speed (the taking-up of a fraction 1/(n−1)th of the flow of articles A).

For this purpose, the unit U reads (step 106) the data supplied by the sensor 6 (whether there is also an accumulation on the conveyor 42).

In the comparison step 107, the unit checks, on the basis of the signal supplied by the sensor 6, whether the accumulation of products on the conveyor 4 already extends up to the position identified by the sensor 6.

If not, the program goes back to step 106, after setting the respective withdrawal station 2 to operate at the faster speed (withdrawal of 1/(n−1)th of the rows) (step 108).

This means that — as is important for the purposes of the invention — when it is found that one of the user stations Wk has stopped, the control of the system is limited to the acceleration (step 108) of the operation of all the withdrawal stations 2 associated with the other stations Wk which are operating correctly without, however, accelerating the operation of the other user stations and their respective conveyors 4 (that is, of the branch lines as a whole) until it has been found that a certain accumulation of articles A has formed on the respective supply conveyors 4.

This responds, in particular, to the need to accelerate the "taking-up" of the rows of articles A by the withdrawal stations 2 of the branch lines which continue to operate when there is an alarm caused by the detection of the stoppage of one of the machines Wk, without, however, affecting the operation of the whole branch line.

As stated in the introductory part of the description, the increase in speed resulting from the use of this particular arrangement may, in fact, be considerable (even one third or more): moreover, if one considers that the interruptions in the operation of one of the machines Wk are very often of short duration (for example, pauses for paper-changing), it is clearly very often unnecessary to accelerate the operation of the whole system since it can absorb the temporary interruption of its operation without the need for all the stations which are still operative to be operated at the faster speed.

Moreover — as already stated — the speed of one or more withdrawal stations 2 associated with the user stations Wk which are still active may be increased in a situation in which a row of articles A is not immediately available for withdrawal, resulting in the risk of the formation of empty packages.

In the solution according to the invention, the fact that the conveyor 4 and the user station Wk downstream thereof are not made to work at the faster speed immediately ensures that a certain stock of accumulated articles A is formed in any event, thus preventing the formation of empty packages.

In particular, the solution according to the invention prevents oscillations from being set up in the operating speeds of the stations Wk as occurred in those systems in which the stations were subservient to analog piloting signals indicative of the density of the flow of the rows of incoming articles A.

In the solution according to the invention, therefore, the conveyor 4 and the station Wk do not change immediately to the faster operating speed in the event of the stoppage of one of the stations Wk. If this happens without any accumulation on the conveyor 4 and, more precisely, on the portion 42, the control system goes back to step 104 after it has accelerated (step 108) the withdrawal speeds of the stations 2 associated with the user stations which are still active. The system thus returns to its normal operating cycle if, in the meantime, the user station which had stopped has started to operate again.

A general change to the alarm configuration (in which the operation of the user stations Wk which are still active and the respective conveyors 4 are — also — accelerated to a speed which ensures that a fraction 1/(n−1)th of the total flow is disposed of) does take place, however, if, but only if, the signal supplied by the sensor 6 confirms that an accumulation has formed (a positive result of the comparison step 107).

At this point, the unit U effectively accelerates (step 109) the operation not only of the withdrawal station 2, but also of the conveyor 4 and of the user station Wk. All this refers to each branch line of the system in which there is an active user station Wk.

This operating condition is maintained until the unit U obtains negative results from two comparisons made in successive decision steps 110 and 111.

In step 110, the unit U checks whether the signal supplied by the sensor 6 indicates that there is still an accumulation on the branch 42. If so, the faster operating speed is maintained.

If the result is negative (if the accumulation on the portion 42 of the conveyor 4 is found to have been disposed of), the unit U reads the signal supplied by the sensor 7 associated with the storage conveyor 3.

If this sensor indicates the presence of rows accumulated on the conveyor 3 (a positive result in step 111) the unit U keeps the system operating at the faster speed.

The presence of rows accumulated on the conveyor 3 is actually indicative of the fact that there is a backlog of rows of articles A to be disposed of and it is therefore necessary for the system to continue to operate at the faster speed.

In particular, the accumulation which has formed on the conveyor 3 is disposed of primarily (according to known principles which do not need to be repeated herein) by the withdrawal station 2 which is furthest downstream. As stated in the introduction to the present description, this station is usually formed so that it can withdraw rows of articles both upstream and downstream of the station itself.

In particular, the withdrawal station in question can withdraw the articles A which are on the storage conveyor 3 and transfer them to its user station Wn.

The unit U resets (step 112) the whole system to operate at the slower speed (which ensures that each branch line disposes of a quota of 1/nth of the total flow of articles and returns the control system to the first step) only when the comparison made in step 111 also gives a negative result (which indicates that the accumulation on the conveyor 4 has been disposed of.

Naturally, the principle of the invention remaining the same, the details of construction and forms of embodiment may be varied widely with respect to those described and illustrated, without thereby departing from the scope of the present invention.

What is claimed is:

1. A method of advancing articles in a conveyor system having
    a main conveyor line on which a flow of articles advances,
    a plurality of branch lines which can operate at a normal operating speed and at least one faster speed and onto which respective fractions of the flow of articles are transferred, and a user station associated with each branch line,
    the method including the steps of detecting stoppage of at least one branch line, detecting a formation of a predetermined accumulation of articles on each of other branch lines which have not experienced stoppage causing the other branch lines to operate at a faster speed in order to ensure that the flow of articles is taken up,
    but only when the predetermined accumulation of articles has formed on at least one of the other branch lines.

2. A method according to claim 1, applied to a conveyor system in which each branch line has in cascade:
    a withdrawal station for withdrawing articles from the main conveyor, and
    a conveyor,
    wherein the method includes the steps of:
        causing the withdrawal station of each branch line which is still active to operate at the faster speed when the stoppage of another branch line has been detected, and
        keeping the conveyor and the user station at the normal, slower operating speed until the formation of an accumulation on the conveyor is detected.

3. A method of advancing articles in a conveyor system having a main conveyor line on which a flow of articles advances, a plurality of branch lines which can operate at a normal operating speed and at least one faster speed and onto which respective fractions of the flow of article are transferred, and storage means for temporarily storing any articles which have not been transferred onto the branch lines, comprising the steps of detecting stoppage of any branch line and causing the other branch lines which are still active to operate at a faster speed in order to ensure that the flow of articles is taken up, detecting the formation of any accumulation of articles on each of the branch lines which are still active and bringing about the operation at a faster speed only when there is an accumulation, detecting the presence of articles on the storage means, and causing the branches to return to the normal operating speed after an acceleration to the faster speed only after all the articles on the storage means have been disposed of.

4. A system for conveying articles comprising:
    a main line for conveying a flow of articles,
    a plurality of branch lines which can operate at a normal operating speed and at least one faster speed in order to transfer respective fractions of the flow of articles,
    a user station associated with each branch line,
    means for detecting stoppage of any branch line and causing the other branch lines which are still active to operate at a correspondingly faster speed to ensure that the flow of articles is taken up,
    sensor means for detecting the formation of any accumulation of articles on each branch line which is still active, and
    control means for bringing about the operation at the faster speed only when there is a predetermined accumulation of articles on the still active branch lines and configured such that operation of the user stations associated with the still active branch lines is precluded prior to the predetermined accumulation of articles.

5. A system according to claim 4, wherein each branch line has in cascade:
    a withdrawal station for withdrawing articles from the main conveyor, and
    a conveyor,
    and wherein the control means accelerate the operation of the withdrawal station of each branch line which is still active to the faster speed when the stoppage of another branch is detected but keep the conveyor means and the user station at the normal operating speed until the sensor means detect the formation of an accumulation on the conveyor means.

6. A system according to claim 4, wherein the sensor means comprise optical sensors.

7. A system according to claim 4, wherein it includes storage means for temporarily storing any articles which have not been transferred onto the branch lines and further sensor means for detecting onto the branch lines and further sensor means wherein the control means cause the branch lines to return to the normal operating speed after an acceleration to the faster speed only when the further sensor means detect that all the articles on the storage means have been disposed of.

8. A system for conveying articles, comprising a main line for conveying a flow of articles, a plurality of branch lines which operate at a normal operating speed and at least one faster speed in order to transfer respective fractions of the flow of articles, means for detecting the stoppage of any branch line and causing the other branch lines which are still active to operate at a correspondingly faster speed to ensure that the flow of articles is taken up, sensor means for detecting the formation of any accumulation of articles on each branch line which is still active, control means for bringing about the operation at a faster speed only when there is an accumulation, storage means for temporarily storing any articles which have not been transferred onto the branch lines, and additional sensor means for detecting the presence of articles on the storage means, wherein the control means cause the branch lines to return to the normal operating speed after an acceleration to the faster speed only when the additional sensor means detect that all the articles on the storage means have been disposed of.

* * * * *